US010651986B2

(12) United States Patent
Tseng et al.

(10) Patent No.: US 10,651,986 B2
(45) Date of Patent: May 12, 2020

(54) WIRELESS COMMUNICATION DEVICE AND METHOD FOR CONTROLLING ANTENNA ARRAY

(71) Applicant: Wistron NeWeb Corp., Hsinchu (TW)

(72) Inventors: Nai-Yu Tseng, Hsinchu (TW); Fu-Ming Kang, Hsinchu (TW); Chieh-Wen Cheng, Hsinchu (TW); Chun-Hsiung Chuang, Hsinchu (TW); Ho-ren Chen, Hsinchu (TW)

(73) Assignee: Wistron NeWeb Corp., Hsinchu (TW)

( * ) Notice: Subject to any disclaimer, the term of this patent is extended or adjusted under 35 U.S.C. 154(b) by 369 days.

(21) Appl. No.: 15/131,046

(22) Filed: Apr. 18, 2016

(65) Prior Publication Data

US 2016/0380733 A1 Dec. 29, 2016

(30) Foreign Application Priority Data

Jun. 23, 2015 (TW) .............................. 104120144 A

(51) Int. Cl.
*H04B 1/00* (2006.01)
*H04W 4/00* (2018.01)
(Continued)

(52) U.S. Cl.
CPC ........... *H04L 5/0048* (2013.01); *H04B 7/063* (2013.01); *H04L 5/0023* (2013.01);
(Continued)

(58) Field of Classification Search
CPC ... H04L 5/0053; H04L 5/0023; H04L 1/0026; H04L 5/0055; H04L 2025/03414; H04L 27/2602; H04L 27/2626
(Continued)

(56) References Cited

U.S. PATENT DOCUMENTS

2002/0098872 A1* 7/2002 Judson ................. H04B 7/0623
455/562.1
2002/0146029 A1* 10/2002 Kavak .................. H04B 7/0617
370/441
(Continued)

FOREIGN PATENT DOCUMENTS

TW    201433005    8/2014
TW    201521366    6/2015

OTHER PUBLICATIONS

"Office Action of Taiwan Counterpart Application", dated May 25, 2016, p. 1-p. 6.

*Primary Examiner* — David C Payne
*Assistant Examiner* — Sarah Hassan
(74) *Attorney, Agent, or Firm* — JCIPRNET

(57) ABSTRACT

A method for controlling an antenna array is provided, which includes following steps. Associations with a plurality of mobile devices are established, and at least one characteristic parameter table corresponding to the mobile devices is generated. When a plurality of transmission request signals are received simultaneously and the mobile devices are divided into a user group, a multi-user antenna index of the antenna array is generated based on the at least one characteristic parameter table, and a plurality of data streams corresponding to the mobile devices are transmitted simultaneously through the antenna array. When the transmission request signals are received simultaneously and the mobile devices are not divided into the user group, a single-user antenna index of the antenna array is generated based on the at least one characteristic parameter table, and the data streams corresponding to the mobile devices are transmitted one-by-one through the antenna array.

16 Claims, 3 Drawing Sheets

(51) Int. Cl.
*H04L 5/00* (2006.01)
*H04W 28/02* (2009.01)
*H04W 72/04* (2009.01)
*H04B 7/06* (2006.01)
*H04B 7/0452* (2017.01)
*H04W 72/12* (2009.01)
*H04B 7/10* (2017.01)

(52) U.S. Cl.
CPC ....... *H04L 5/0053* (2013.01); *H04W 28/0236* (2013.01); *H04W 72/046* (2013.01); *H04B 7/0452* (2013.01); *H04B 7/10* (2013.01); *H04L 5/006* (2013.01); *H04W 72/121* (2013.01)

(58) Field of Classification Search
USPC .......................................... 375/130; 455/101
See application file for complete search history.

(56) References Cited

U.S. PATENT DOCUMENTS

| | | | | |
|---|---|---|---|---|
| 2005/0105485 A1* | 5/2005 | Cleveland | ............ | H04B 7/0617 370/320 |
| 2007/0223423 A1* | 9/2007 | Kim | ...................... | H04B 7/0417 370/334 |
| 2010/0117913 A1* | 5/2010 | Jung | ...................... | H01Q 1/246 343/724 |
| 2014/0177745 A1* | 6/2014 | Krishnamurthy | .... | H04B 7/0413 375/267 |
| 2015/0023267 A1* | 1/2015 | Lim | ...................... | H04L 1/1854 370/329 |

\* cited by examiner

WIRELESS COMMUNICATION DEVICE AND METHOD FOR CONTROLLING ANTENNA ARRAY

CROSS-REFERENCE TO RELATED APPLICATION

This application claims the priority benefit of Taiwan application serial no. 104120144, filed on Jun. 23, 2015. The entirety of the above-mentioned patent application is hereby incorporated by reference herein and made a part of this specification.

BACKGROUND OF THE INVENTION

Field of the Invention

The invention relates to a wireless communication device and a method for controlling an antenna array, and particularly relates to a wireless communication device supporting a multi-user multi-input multi-output technique and a method for controlling an antenna array.

Description of Related Art

In a wireless local area network (LAN) under an IEEE 802.11n communication standard, an access point adopts a single-user multi-input multi-output (SU-MIMO) transmission technique, i.e. the access point transmits data to each of the user equipment (UE) one-by-one. Along with quick development of wireless communication technology, the communication standard of the wireless LAN has evolved to IEEE 802.11ac, and can support a multi-user MIMO (MU-MIMO) transmission technique. In the MU-MIMO transmission technique, the access point can use a plurality of antenna elements to simultaneously transmit data to a plurality of UEs in a same user group, and the access point can dynamically adjust the members in the same user group.

Generally, smart antennas are applied to the SU-MIMO transmission technique. The smart antenna can be composed of antenna array with reconfigurable radiation pattern or polarization diversity, and the above antenna array corresponds to an antenna index. Moreover, a conventional method for controlling the antenna array is to set the antenna index of the antenna array through a training operation. However, in the MU-MIMO transmission technique, the antenna array has to transmit data to a plurality of UEs simultaneously, so that the conventional method for controlling the antenna array may result in the fact that the access point has to spend a large amount of time to complete setting the antenna index of the antenna array. Moreover, the access point has to complete setting the antenna index of the antenna array before using the antenna array to transmit data to the UEs.

Therefore, regarding the MU-MIMO transmission technique, the conventional method for controlling the antenna array generally results in the fact that the access point cannot complete transmitting data to the UEs before the user group is changed. In other words, the conventional method for controlling the antenna array generally causes the access point to be incapable of using the antenna array with the antenna index to transmit data under the MU-MIMO mode, so that the access point cannot achieve a good interference mitigation effect and a good communication range.

SUMMARY OF THE INVENTION

Accordingly, the invention is directed to a wireless communication device and a method for controlling an antenna array, by which a multi-user antenna index and a single-user antenna index of the antenna array are set based on a characteristic parameter table. In this way, a setting time of the antenna array is effectively decreased, such that the antenna array is adapted to be applied to a multi-user multi-input multi-output (MU-MIMO) transmission technique.

The invention provides a method for controlling an antenna array, which is adapted to a wireless communication device, and the method includes following steps. Associations with a plurality of mobile devices are established, and at least one characteristic parameter table corresponding to the mobile devices is generated according to a plurality of association state information transmitted by the mobile devices. When a plurality of transmission request signals are received simultaneously from the mobile devices and the mobile devices are divided into a user group, a multi-user antenna index of the antenna array is generated based on the at least one characteristic parameter table, and a plurality of data streams corresponding to the mobile devices are transmitted simultaneously through the antenna array. When the transmission request signals are received simultaneously and the mobile devices are not divided into the user group, a single-user antenna index of the antenna array is generated based on the at least one characteristic parameter table, and the data streams corresponding to the mobile devices are transmitted one-by-one through the antenna array.

The invention provides a wireless communication device including an antenna array and a control circuit. The wireless communication device sequentially establishes associations with a plurality of mobile devices, and the control circuit generates at least one characteristic parameter table corresponding to the mobile devices according to a plurality of association state information transmitted by the mobile devices. When the wireless communication device simultaneously receives a plurality of transmission request signals from the mobile devices, and the control circuit divides the mobile devices into a user group, the control circuit generates a multi-user antenna index of the antenna array based on the at least one characteristic parameter table, and simultaneously transmits a plurality of data streams corresponding to the mobile devices through the antenna array. When the wireless communication device simultaneously receives the transmission request signals from the mobile devices, and the mobile devices are not divided into the user group, the control circuit generates a single-user antenna index of the antenna array based on the at least one characteristic parameter table, and transmits the data streams corresponding to the mobile devices one-by-one through the antenna array.

According to the above descriptions, the multi-user antenna index and the single-user antenna index of the antenna array are set based on the characteristic parameter table, so as to effectively decrease a setting time of the antenna array. In this way, the antenna array is adapted to be applied to the MU-MIMO transmission technique, and the wireless communication device has a good interference mitigation effect and a good communication range.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings

DESCRIPTION OF EMBODIMENTS

Figure 1:
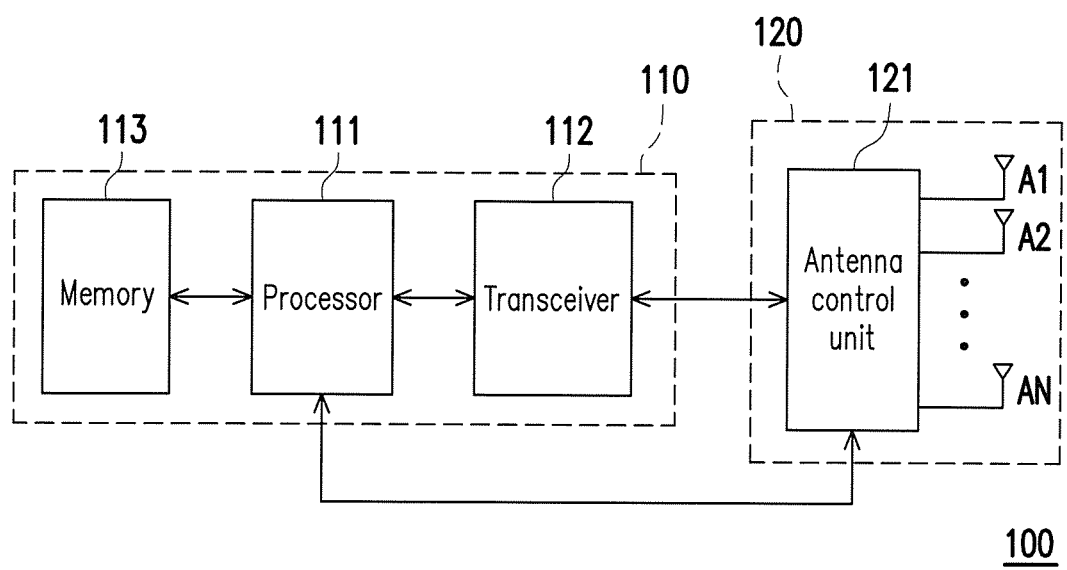
FIG. 1 is a block schematic diagram of a wireless communication device according to an embodiment of the invention.

FIG. 1 is a block schematic diagram of a wireless communication device according to an embodiment of the invention. As shown in FIG. 1, the wireless communication device 100 includes a control circuit 110 and an antenna array 120. The control circuit 110 includes a processor 111, a transceiver 112 and a memory 113, and the antenna array 120 includes an antenna control unit 121 and a plurality of antenna elements A1-AN. In an embodiment, the wireless communication device 100 can be applied to a wireless local area network (LAN). For example, the wireless communication device 100 is, for example, an access point in the wireless LAN, and can establish wireless transmissions with one or a plurality of mobile devices (i.e. user equipment) through the antenna array 120.

Moreover, the antenna array 120 corresponds to an antenna index, and the antenna array 120 is, for example, an antenna array having polarization diversity or an antenna array having reconfigurable radiation pattern. Namely, the antenna array 120 can be used to form a smart antenna. Moreover, the antenna index is, for example, a digital control signal having M bits, wherein M is a positive integer. The antenna control unit 121 can control polarizations or radiation patterns of the antenna elements A1-AN according to the digital control signal, such that the antenna elements A1-AN can radiate electromagnetic waves towards a required direction.

Figure 2:
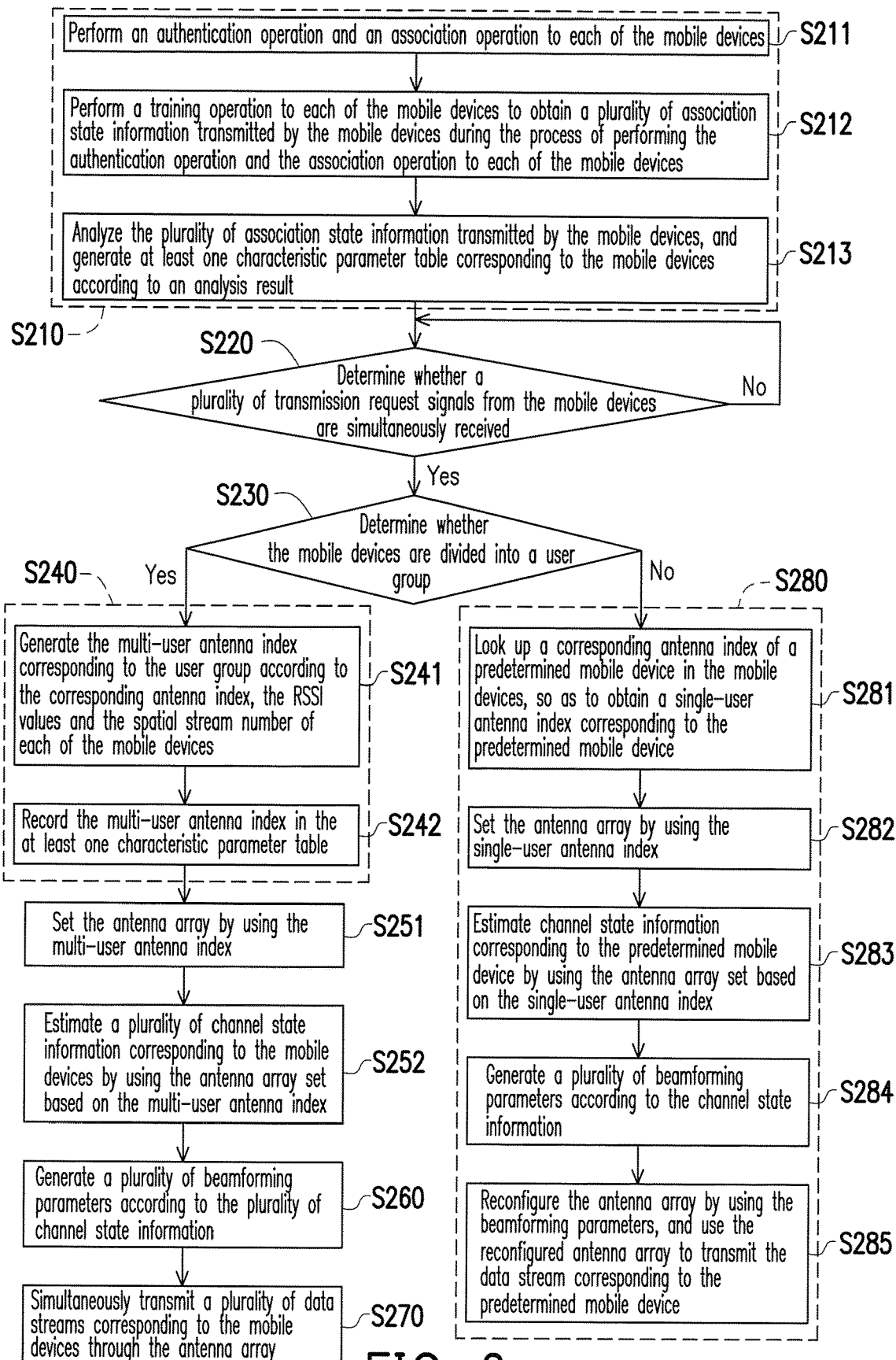
FIG. 2 is a flowchart illustrating a method for controlling an antenna array according to an embodiment of the invention.

The wireless communication device 100 may adopt a single-user multi-input multi-output (SU-MIMO) mode or a multi-user multi-input multi-output (MU-MIMO) mode to control the antenna array 120, so as to transmit data streams to mobile devices through the antenna array 120. FIG. 2 is a flowchart illustrating a method for controlling an antenna array according to an embodiment of the invention. The operation of the wireless communication device 100 is introduced below with reference of FIGS. 1 and 2. In step S210, a plurality of mobile devices enter a service range of the wireless communication device 100 one-by-one. Moreover, the wireless communication device 100 sequentially establishes associations with the mobile devices, and the control circuit 110 generates at least one characteristic parameter table corresponding to the mobile devices according to a plurality of association state information transmitted by the mobile devices. The at least one characteristic parameter table is stored in the memory 113 of the control circuit 110.

In view of detailed steps of the step S210, in step S211, when one mobile device enters the service range of the wireless communication device 100, the wireless communication device 100 performs an authentication operation and an association operation to the mobile device. In this way, the wireless communication device 100 can execute an identification authentication of the mobile device, and record all data of the mobile device, so as to complete association with the mobile device. In other words, the wireless communication device 100 performs the authentication operation and the association operation to each of the mobile devices, so as to complete association with each of the mobile devices.

In step S212, during the process of establishing the association with the mobile device, the wireless communication device 100 also performs a training operation to the mobile device to obtain association state information transmitted by the mobile device. In other words, during the process of performing the authentication operation and the association operation to each of the mobile devices, the wireless communication device 100 also performs the training operation to each of the mobile devices to obtain a plurality of association state information transmitted by the mobile devices. Moreover, in step S213, the control circuit 110 analyzes the plurality of association state information, and generates at least one characteristic parameter table corresponding to the mobile devices according to an analysis result.

For example, taking one of the mobile devices as an example, the transceiver 112 receives the association state information (for example, characteristic parameters related to a signal strength and communication quality) from the mobile device through the antenna array 120, and transmits the association state information to the processor 111. Moreover, the processor 111 analyzes the association state information, and generates a corresponding antenna index, a plurality of received signal-strength indicator (RSSI) values corresponding to the antenna elements A1-AN and a spatial stream number of the mobile device according to the analysis result. In other words, the at least one characteristic parameter table records the corresponding antenna index, a plurality of RSSI values and a spatial stream number of each of the mobile devices.

In step S220, the wireless communication device 100 determines whether a plurality of transmission request signals from the mobile devices are simultaneously received. When the wireless communication device 100 simultaneously receives the transmission request signals from the mobile devices, as shown in step S230, the control circuit 110 determines whether to divide the mobile device into a user group. For example, the transceiver 112 simultaneously receives a plurality of transmission request signals from the mobile devices through the antenna array 120, and transmits the transmission request signals to the processor 111. When the transmission request signals are received, the processor 111 determines whether to divide the mobile devices into a user group according to factors such as a spatial distribution, signal transmission characteristics, quality of service, etc. of the mobile devices.

When the mobile devices are divided into the user group, the wireless communication device 100 operates in the MU-MIMO mode, and as shown in step S240, the control circuit 110 generates a multi-user antenna index of the antenna array 120 based on the at least one characteristic parameter table. The multi-user antenna index is an antenna index corresponding to the antenna array 120 in the MU-MIMO mode. Moreover, in the MU-MIMO mode, the wireless communication device 100 can use the antenna array 120 to simultaneously transmit a plurality of data streams corresponding to the mobile devices. In view of detailed steps of the step S240, in step S241, the control circuit 110 generates the multi-user antenna index corresponding to the user group according to the corresponding antenna index, the RSSI values and the spatial stream number of each of the mobile devices.

For example, if the wireless communication device 100 simultaneously receives the transmission request signals sent by a first mobile device and a second mobile device, and the first mobile device and the second mobile device are divided into a user group, the processor 111 looks up at least one characteristic parameter table in the memory 113. In detail, the control circuit 110 can determine a setting state of the antenna elements (for example, directions of the antenna elements) for each mobile device and a plurality of RSSI values detected by the antenna elements under the setting state according to the corresponding antenna index and the RSSI values of each of the mobile devices in the at least one characteristic parameter table.

For example, the antenna array 120, for example, includes 4 antenna elements A1-A4, and each antenna element supports 4 directions D1-D4. Moreover, the processor 111 can look up data related to the first mobile device in the at least one characteristic parameter table to obtain data shown in a Table 1. Referring to the Table 1, when the wireless communication device 100 independently performs data transmission to the first mobile device, the antenna control unit 121 can control the antenna elements A1-A4 according to the corresponding antenna index of the first mobile device, such that the antenna elements A1-A4 are respectively directed toward the directions D1, D2, D3 and D4, and the RSSI values detected by the antenna control unit 121 through the antenna elements A1-A4 can be respectively values S11, S12, S13 and S14.

TABLE 1

|  | A1 | A2 | A3 | A4 |
| --- | --- | --- | --- | --- |
| Direction | D1 | D2 | D3 | D4 |
| RSSI value | S11 | S12 | S13 | S14 |

Similarly, the processor 111 can look up data related to the second mobile device in the at least one characteristic parameter table to obtain data shown in a Table 2. Referring to the Table 2, when the wireless communication device 100 independently performs data transmission to the second mobile device, the antenna control unit 121 can control the antenna elements A1-A4 according to the corresponding antenna index of the second mobile device, such that the antenna elements A1-A4 are respectively directed toward the directions D2, D3, D4 and D1, and the RSSI values detected by the antenna control unit 121 through the antenna elements A1-A4 can be respectively values S21, S22, S23 and S24.

TABLE 2

|  | A1 | A2 | A3 | A4 |
| --- | --- | --- | --- | --- |
| Direction | D2 | D3 | D4 | D1 |
| RSSI value | S21 | S22 | S23 | S24 |

Moreover, the control circuit 110 can determine that the first mobile device can support 1 spatial stream and the second mobile device can support 3 spatial streams according to the spatial stream number corresponding to the first mobile device and the spatial stream number corresponding to the second mobile device in the at least one characteristic parameter table. Moreover, the control circuit 110 can determine which one of the first mobile device and the second mobile device has a higher priority. If the first mobile device has the higher priority, the control circuit 110 compares the RSSI values S11-S14 in the Table 1 to select one of the 4 antenna elements A1-A4 to serve as the antenna element for transmitting the data stream of the first mobile device in the MU-MIMO mode.

For example, if the RSSI value S11 is greater than the other three RSSI values S12-S14, the control circuit 110 selects the antenna element A1 corresponding to the RSSI value S11. Moreover, the control circuit 110 generates a multi-user antenna index, and the multi-user antenna index defines that the antenna element A1 is used for transmitting the data stream of the first mobile device (i.e. the direction of the antenna element A1 is set to D1), and the antenna elements A2-A4 are used for transmitting the data stream of the second mobile device (i.e. the directions of the antenna elements A2-A4 are respectively set to D3, D4 and D1). In other words, the antenna control unit 121 can control the antenna array 120 according to the multi-user antenna index, such that the antenna elements A1-A4 are respectively directed toward the directions D1, D3, D4 and D1.

If the second mobile device has the higher priority, the control circuit 110 compares the RSSI values S21-S24 in the Table 2 to select 3 larger RSSI values, for example, S21-S23 from the RSSI values S21-S24, and correspondingly selects 3 antenna elements, for example, A1-A3 from the antenna elements A1-A4. Moreover, the control circuit 110 accordingly generates a multi-user antenna index, and the multi-user antenna index defines that the antenna elements A1-A3 are used for transmitting the data stream of the second mobile device (i.e. the directions of the antenna elements A1-A3 are respectively set to D2, D3 and D4), and the antenna element A4 is used for transmitting the data stream of the first mobile device (i.e. the direction of the antenna element A4 is set to D4). In other words, the antenna control unit 121 can control the antenna array 120 according to the multi-user antenna index, such that the antenna elements A1-A4 are respectively directed toward the directions D2, D3, D4 and D4.

It should be noted that besides that the control circuit 110 can refer to the RSSI values in the at least one characteristic parameter table to select the antenna element, the control circuit 110 can also refer to a predetermined energy distribution mechanism simultaneously, for example, an energy distribution mechanism based on an error rate optimized. Namely, during the process of performing the training operation, test packets can be transmitted to the mobile device through each antenna element, and the control circuit 110 can calculate a packet error rate of each antenna element corresponding to the mobile device according to acknowledgement packets transmitted by the mobile device, and selects the antenna element according to the packet error rate. Moreover, in step S242, the control circuit 110 records the multi-user antenna index in the at least one characteristic parameter table or stores the same in a multi-user parameter table. In addition, in step S251, the control circuit 110 sets the antenna array 120 by using the multi-user antenna index. For example, the processor 111 of the control circuit 110 can transmit the multi-user antenna index to the antenna control unit 121, and the antenna control unit 121 can update the antenna index of the antenna array 120 according to the multi-user antenna index.

It should be noted that the wireless communication device 100 can adopt a transmit beamforming technique to enhance a gain of the antenna array 120. Therefore, before the data streams corresponding to the mobile devices are transmitted, in step S252, the wireless communication device 100 can use the antenna array 120 set based on the multi-user antenna index to estimate a channel characteristic with each of the mobile devices, so as to obtain channel state information corresponding to each of the mobile devices. Moreover, in step S260, the control circuit 110 can generate beamforming parameters according to a plurality of channel state information of the mobile devices. In this way, the control circuit 110 can further set the antenna array 120 according to the beamforming parameter, so as to further enhance the gain of the antenna array 120.

Under the MU-MIMO mode, as shown in step S270, the wireless communication device 100 simultaneously transmits a plurality of data streams corresponding to the mobile devices through the antenna array 120. In view of detailed steps of the step S270, the control circuit 110 can reconfigure the antenna array 120 by using a plurality of the beamforming parameters. Namely, the control circuit 110 can set weights corresponding to the antenna elements A1-AN in the antenna array by using the beamforming parameters, so as to achieve a combination of the smart antenna and the transmit beamforming technique. Moreover, the wireless communication device 100 can use the reconfigured antenna array 120 to simultaneously transmit a plurality of data streams corresponding to the mobile devices.

It should be noted that under the MU-MIMO mode, the control circuit 110 sets the antenna index of the antenna array 120 based on the characteristic parameter table, so that a setting time of the antenna index can be greatly decreased. In this way, before the user group is changed, the wireless communication device 100 can complete channel estimation and data transmission of the mobile device. In other words, the wireless communication device 100 can use the antenna array 120 having the antenna index to simultaneously transmit a plurality of data streams corresponding to a plurality of the mobile devices in the MU-MIMO mode, so as to achieve a good interference mitigation effect and a good communication range.

Referring to FIGS. 1 and 2, when the mobile devices are not divided into the user group, as shown in step S280, the wireless communication device 100 is operated in the SU-MIMO mode, and transmits the data streams corresponding to the mobile devices individually or one-by-one through the antenna array 120. For example, taking one of the mobile devices (i.e. a predetermined mobile device) as an example, in step S281, the processor 111 looks up the corresponding antenna index of the predetermined mobile device, and sets the obtained corresponding antenna index as a single-user antenna index corresponding to the predetermined mobile device, wherein the single-user antenna index is an antenna index corresponding to the antenna array 120 in the SU-MIMO mode. In step S282, the processor 111 transmits the single-user antenna index to the antenna control unit 121, and the antenna control unit 121 sets the antenna array 120 according to the single-user antenna index. Namely, the antenna control unit 121 can update the antenna index of the antenna array 120 based on the single-user antenna index.

Moreover, in step S283, the wireless communication device 100 can use the antenna array 120 set based on the single-user antenna index to estimate a channel characteristic with the predetermined mobile device, so as to obtain channel state information corresponding to the predetermined mobile device. In step S284, the control circuit 110 generates a plurality of beamforming parameters according to the channel state information. Moreover, in step S285, the wireless communication device 100 reconfigures the antenna array 120 by using the beamforming parameters, and uses the reconfigured antenna array 120 to transmit the data stream corresponding to the predetermined mobile device.

Figure 3:
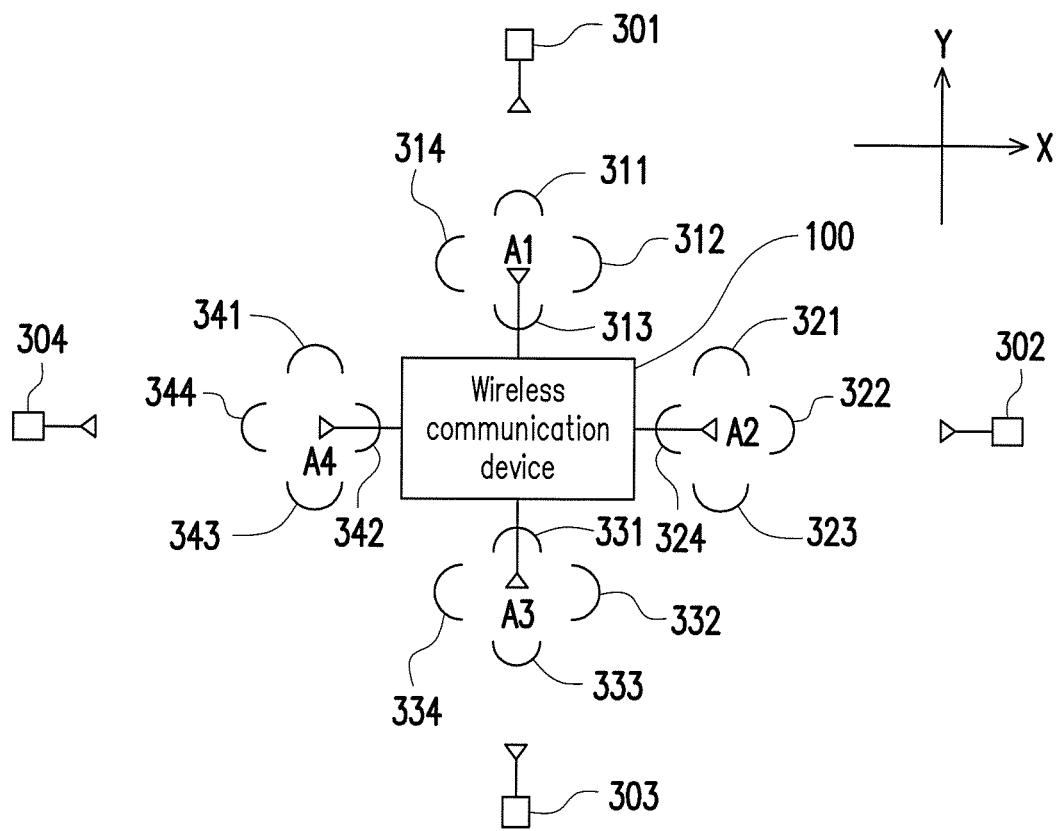
FIG. 3 is a schematic diagram of an application of a wireless communication device according to an embodiment of the invention.

In order to fully convey the spirit of the invention to those skilled in the art, switching of the antenna array performed by the wireless communication device 100 in the SU-MIMO mode and the MU-MIMO mode is introduced below. For example, FIG. 3 is a schematic diagram of an application of the wireless communication device according to an embodiment of the invention. The antenna array 120 includes 4 antenna elements A1-A4. Moreover, the antenna array 120 is an antenna array having reconfigurable radiation pattern, and each of the antenna elements includes a plurality of reflective elements. For example, the antenna element A1 includes reflective elements 311-314. Corresponding relationships between the antenna elements A2-A4 and the reflective elements 321-324, 331-334 and 341-344 can be deduced by analogy.

In view of operation, the antenna control unit 121 can drive one of the reflective elements in each of the antenna elements according to the multi-user antenna index or the single-user antenna index, so as to switch a pattern of each antenna element. For example, taking the antenna element A1 as an example, the antenna control unit 121 can drive the reflective element 313, such that a radiation pattern of the antenna element A1 is directed toward a +Y-axis. Deduced by analogy, the antenna control unit 121 can also drive the reflective element 314, such that the radiation pattern of the antenna element A1 is directed toward a +X-axis.

Further, the mobile device 301-304 respectively have an antenna element, i.e. the spatial stream numbers of the mobile devices 301-304 are all 1, so as to respectively support one spatial stream. When the wireless communication device 100 simultaneously receives the transmission request signals from the mobile devices 301-304, and the mobile devices 301-304 are not divided into one user group, the wireless communication device 100 is switched to the SU-MIMO mode, and transmits the data streams corresponding to the mobile devices 301-304 one-by-one through the antenna elements A1-A4. For example, in the SU-MIMO mode, the wireless communication device 100 can first set the antenna array 120 according to the single-user antenna index corresponding to the mobile device 301. In this way, the antenna control unit 121 can drive the reflective elements 313, 323, 333 and 343 according to the single-user antenna index, such that the radiation patterns of the antenna elements A1-A4 are directed toward the +Y-axis, and the antenna elements A1-A4 are used for transmitting the data stream corresponding to the mobile device 301.

On the other hand, when the wireless communication device 100 simultaneously receives the transmission request signals from the mobile devices 301-304, and the mobile devices 301-304 are divided into one user group, the wireless communication device 100 is switched to the MU-MIMO mode, and transmits the data streams corresponding to the mobile devices 301-304 simultaneously through the antenna elements A1-A4. For example, in the MU-MIMO mode, the wireless communication device 100 can set the antenna array 120 according to the multi-user antenna index corresponding to the user group.

The multi-user antenna index defines that the antenna element A1 is used for transmitting the data stream of the mobile device 301, the antenna element A2 is used for transmitting the data stream of the mobile device 302, the antenna element A3 is used for transmitting the data stream of the mobile device 303, and the antenna element A4 is used for transmitting the data stream of the mobile device 304.

Therefore, in the MU-MIMO mode, the antenna control unit 121 can drive the reflective elements 313, 324, 331 and 342 according to the antenna index set based on the multi-user antenna index. In this way, the field patterns of the antenna elements A1-A4 are respectively directed toward the +Y-axis, +X-axis, −Y-axis and −X-axis, so as to simultaneously transmit the data streams corresponding to the mobile devices 301-304 through the antenna elements A1-A4.

Figure 4:
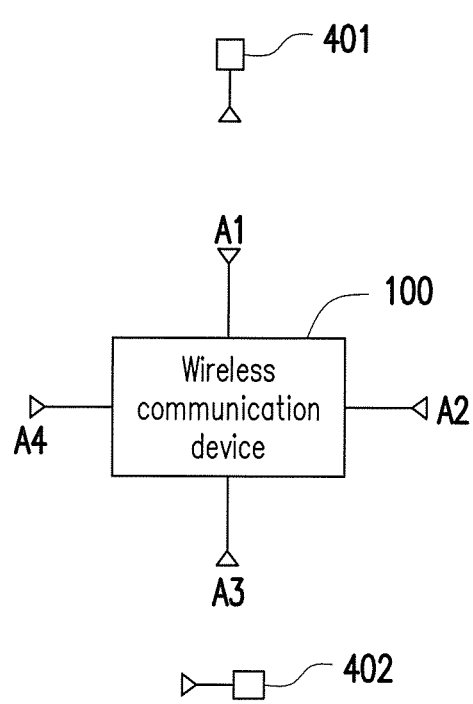
FIG. 4 is a schematic diagram of an application of a wireless communication device according to another embodiment of the invention.

FIG. 4 is a schematic diagram of an application of the wireless communication device according to another embodiment of the invention. The antenna array 120 includes 4 antenna elements A1-A4, and the antenna array 120 is an antenna array having polarization diversity. Moreover, the mobile device 401 has an antenna with vertical polarization, and the mobile device 402 has an antenna with horizontal polarization. In view of operation, the antenna control unit 121 can switch polarity of each antenna element according to the multi-user antenna index or the single-user antenna index.

For example, when the transmission request signals are simultaneously received from the mobile devices 401 and 402, and the mobile devices 401 and 402 are not divided into one user group, the wireless communication device 100 is switched to the SU-MIMO mode, and transmits the data streams corresponding to the mobile devices 401 and 402 one-by-one through the antenna elements A1-A4. For example, in the SU-MIMO mode, the wireless communication device 100 can first set the antenna array 120 according to the single-user antenna index corresponding to the mobile device 401. In this way, the antenna control unit 121 can switch the polarities of the antenna elements A1-A4 to the vertical polarization according to the single-user antenna index, so as to transmit the data stream corresponding to the mobile device 401 through the antenna elements A1-A4.

On the other hand, when the transmission request signals are simultaneously received from the mobile devices 401 and 402, and the mobile devices 401 and 402 are divided into one user group, the wireless communication device 100 is switched to the MU-MIMO mode. In the MU-MIMO mode, the wireless communication device 100 sets the antenna array 120 according to the multi-user antenna index corresponding to the user group, wherein the multi-user antenna index defines that the antenna elements A1 and A2 are used for transmitting the data stream of the mobile device 401, and the antenna elements A3 and A4 are used for transmitting the data stream of the mobile device 402. Therefore, in the MU-MIMO mode, the antenna control unit 121 can switch the polarities of the antenna elements A1 and A2 to vertical polarization and switch the polarities of the antenna elements A3 and A4 to horizontal polarization according to the antenna index set based on the multi-user antenna index.

In summary, during a process of establishing associations with the mobile devices, the characteristic parameter table corresponding to the mobile devices is generated, and the antenna index of the antenna array is set according to the data in the characteristic parameter table in the MU-MIMO mode. In this way, the setting time of the antenna index of the antenna array in the MU-MIMO mode is effectively decreased. Therefore, before the user group is changed, the wireless communication device can complete channel estimation and data transmission of the mobile devices. In other words, the wireless communication device can use the antenna array having the antenna index to simultaneously transmit a plurality of data streams corresponding to a plurality of the mobile devices in the MU-MIMO mode, such that the wireless communication device may have a good interference mitigation effect and a good communication range.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A method for controlling an antenna array, adapted to a wireless communication device, and the method for controlling the antenna array comprising:

establishing associations with a plurality of mobile devices, and generating a plurality of characteristic parameter tables corresponding to the plurality of mobile devices, respectively, according to a plurality of association state information transmitted by the plurality of mobile devices;

determining whether the mobile devices are divided into a user group when a plurality of transmission request signals from the mobile devices are received;

when the plurality of transmission request signals from the mobile devices are received and the mobile devices are divided into the user group, generating a multi-user antenna index of the antenna array based on the plurality of characteristic parameter tables and transmitting a plurality of data streams corresponding to the mobile devices simultaneously through the antenna array;

when the transmission request signals are received and the mobile devices are not divided into the user group, generating a single-user antenna index of the antenna array based on the at least one characteristic parameter table and transmitting the data streams corresponding to the mobile devices one-by-one through the antenna array;

operating the wireless communication device in a multi-user multi-input multi-output mode when the mobile devices are divided into the user group, so as to simultaneously transmit the data streams corresponding to the mobile devices through the antenna array; and operating the wireless communication device in a single-user multi-input multi-output mode when the mobile devices are not divided into the user group, so as to transmit the data streams corresponding to the mobile devices one-by-one through the antenna array, wherein the multi-user antenna index and the single-user antenna index are digital control signals having a plurality of bits, wherein the antenna array comprises a plurality of antenna elements and an antenna control unit, the antenna array is an antenna array with reconfigurable radiation pattern, a control circuit of the wireless communication device transmits the multi-user antenna index or the single-user antenna index to the antenna control unit, and the antenna control unit switches radiation patterns of the antenna elements in response to the multi-user antenna index or the single-user antenna index.

2. The method for controlling the antenna array as claimed in claim 1, wherein the step of establishing associations with the mobile devices, and generating the at least one characteristic parameter table corresponding to the mobile devices according to the association state information transmitted by the mobile devices comprises:

sequentially establishing associations with the mobile devices;

performing an authentication operation and an association operation to each of the mobile devices;

performing a training operation to each of the mobile devices to obtain the plurality of association state information transmitted by the mobile devices during the process of performing the authentication operation and the association operation to each of the mobile devices; and analyzing the plurality of association state information transmitted by the mobile devices, and generating the at least one characteristic parameter table corresponding to the mobile devices according to an analysis result.

3. The method for controlling the antenna array as claimed in claim 1, wherein the at least one characteristic parameter table records a corresponding antenna index, a plurality of received signal-strength indicator values and a spatial stream number of each of the mobile devices, and the step of generating the multi-user antenna index of the antenna array based on the at least one characteristic parameter table comprises:

generating the multi-user antenna index corresponding to the user group according to the corresponding antenna index, the received signal-strength indicator values and the spatial stream number of each of the mobile devices; and recording the multi-user antenna index in the at least one characteristic parameter table or a multi-user parameter table.

4. The method for controlling the antenna array as claimed in claim 3, further comprising:

setting the antenna array by using the multi-user antenna index;

estimating a plurality of channel state information corresponding to the mobile devices by using the antenna array set based on the multi-user antenna index; and generating a plurality of beamforming parameters according to the plurality of channel state information.

5. The method for controlling the antenna array as claimed in claim 4, wherein the step of transmitting the data streams corresponding to the mobile devices simultaneously through the antenna array comprises:

reconfiguring the antenna array by using the beamforming parameters; and transmitting the data streams corresponding to the mobile devices simultaneously through the reconfigured antenna array.

6. The method for controlling the antenna array as claimed in claim 3, wherein the step of generating the single-user antenna index of the antenna array based on the at least one characteristic parameter table and transmitting the data streams corresponding to the mobile devices one-by-one through the antenna array comprises:

looking up the corresponding antenna index of a predetermined mobile device in the mobile devices to obtain the single-user antenna index corresponding to the predetermined mobile device;

setting the antenna array by using the single-user antenna index;

estimating channel state information of the predetermined mobile device by using the antenna array set based on the single-user antenna index;

generating a plurality of beamforming parameters according to the channel state information; and reconfiguring the antenna array by using the beamforming parameters, and transmitting the data stream corresponding to the predetermined mobile device by using the reconfigured antenna array.

7. The method for controlling the antenna array as claimed in claim 1, wherein each of the antenna elements comprises a plurality of reflective elements, and the antenna array drives one of the reflective elements in each of the antenna elements in response to the multi-user antenna index or the single-user antenna index, so as to switch the pattern of each of the antenna elements.

8. The method for controlling the antenna array as claimed in claim 1, wherein the antenna array is an antenna array with polarization diversity, and the antenna array sets a part of the antenna elements to be horizontal polarization and sets the other antenna elements to be vertical polarization in response to the multi-user antenna index or the single-user antenna index.

9. A wireless communication device, comprising:

an antenna array, including an antenna control unit; and a control circuit, wherein the wireless communication device sequentially establishes associations with a plurality of mobile devices, and the control circuit generates a plurality of characteristic parameter tables corresponding to the plurality of mobile devices, respectively, according to a plurality of association state information transmitted by the plurality of mobile devices, wherein when the wireless communication device receives a plurality of transmission request signals from the mobile devices, the control circuit determines whether to divide the mobile devices into a user group, when the wireless communication device receives the plurality of transmission request signals from the mobile devices, and the control circuit divides the mobile devices into the user group, the control circuit generates a multi-user antenna index of the antenna array based on the plurality of characteristic parameter tables, and simultaneously transmits a plurality of data streams corresponding to the mobile devices through the antenna array, when the wireless communication device receives the transmission request signals from the mobile devices, and the mobile devices are not divided into the user group, the control circuit generates a single-user antenna index of the antenna array based on the plurality of characteristic parameter tables, and transmits the data streams corresponding to the mobile devices one-by-one through the antenna array, when the mobile devices are divided into the user group, the wireless communication device operates in a multi-user multi-input multi-output mode, so as to simultaneously transmit the data streams corresponding to the mobile devices through the antenna array, and when the mobile devices are not divided into the user group, the wireless communication device operates in a single-user multi-input multi-output mode, so as to transmit the data streams corresponding to the mobile devices one-by-one through the antenna array, wherein the multi-user antenna index and the single-user antenna index are digital control signals having a plurality of bits, wherein the antenna array comprises a plurality of antenna elements, the antenna array is an antenna array with polarization diversity, the control circuit of the wireless communication device transmits the multi-user antenna index or the single-user antenna index to the antenna control unit, and the antenna control unit controls polarizations of the antenna elements according to the multi-user antenna index or the single-user antenna index.

10. The wireless communication device as claimed in claim 9, wherein the wireless communication device performs an authentication operation and an association operation to each of the mobile devices, and during the process of performing the authentication operation and the association operation to each of the mobile devices, the wireless communication device performs a training operation to each of the mobile devices to obtain the plurality of association state information transmitted by the mobile devices, and the control circuit analyzes the plurality of association state information transmitted by the mobile devices, and generates the at least one characteristic parameter table corresponding to the mobile devices according to an analysis result.

11. The wireless communication device as claimed in claim 9, wherein the at least one characteristic parameter table records a corresponding antenna index, a plurality of received signal-strength indicator values and a spatial stream number of each of the mobile devices, and the control circuit generates the multi-user antenna index corresponding to the user group according to the corresponding antenna index, the received signal-strength indicator values and the spatial stream number of each of the mobile devices, and the control circuit records the multi-user antenna index in the at least one characteristic parameter table or a multi-user parameter table.

12. The wireless communication device as claimed in claim 9, wherein each of the antenna elements comprises a plurality of reflective elements, and the antenna array drives one of the reflective elements in each of the antenna elements in response to the multi-user antenna index or the single-user antenna index, so as to switch the pattern of each of the antenna elements.

13. The wireless communication device as claimed in claim 9, wherein the antenna array is an antenna array with polarization diversity, and the antenna array sets a part of the antenna elements to be horizontal polarization and sets the other antenna elements to be vertical polarization in response to the multi-user antenna index or the single-user antenna index.

14. A wireless communication system, communicating with a first mobile device and a second mobile device, the wireless communication system comprising:
an antenna array, including an antenna control unit; and
a control circuit, wherein the antenna array and the control circuit sequentially establishes associations with the first mobile device and the second mobile device, and the control circuit generates a first characteristic parameter table and a second characteristic parameter table corresponding to the first mobile device and the second mobile device, respectively, according to a plurality of association state information transmitted by the first mobile device and the second mobile device,
wherein when the antenna array receives a plurality of transmission request signals from the first mobile device and the second mobile device and transmits the plurality of transmission request signals to the control circuit, the control circuit determines whether to divide the first mobile device and the second mobile device into a user group,
when the antenna array receives the plurality of transmission request signals from the first mobile device and the second mobile device and transmits the plurality of transmission request signals to the control circuit, and the control circuit divides the mobile devices into the user group, the control circuit generates a multi-user antenna index of the antenna array based on the first characteristic parameter table and the second characteristic parameter table, and simultaneously transmits a plurality of data streams corresponding to the first mobile device and the second mobile device through the antenna array,
when the antenna array receives the transmission request signals from the first mobile device and the second mobile device and transmits the plurality of transmission request signals to the control circuit, and the first mobile device and the second mobile device are not divided into the user group, the control circuit generates a first single-user antenna index of the antenna array based on the first characteristic parameter table, and generates a second single-user antenna index of the antenna array based on the second characteristic parameter table, wherein the control circuit transmits the data streams to the first mobile device according to the first single-user antenna index and transmits the data streams to the second mobile device according to the second single-user antenna index through the antenna array,
when the first mobile device and the second mobile are divided into the user group, the wireless communication device operates in a multi-user multi-input multi-output mode, so as to simultaneously transmit the data streams corresponding to the first mobile device and the second mobile through the antenna array, and
when the first mobile device and the second mobile are not divided into the user group, the wireless communication system operates in a single-user multi-input multi-output mode, so as to transmit the data streams corresponding to the first mobile device and the second mobile one-by-one through the antenna array,
wherein the multi-user antenna index, the first single-user antenna index and the second single-user antenna index are digital control signals having a plurality of bits,
wherein the antenna array comprises a plurality of antenna elements and the antenna array is an antenna array with reconfigurable radiation pattern or polarization diversity, the control circuit of the wireless communication device transmits the multi-user antenna index or the single-user antenna index to the antenna control unit, and the antenna control unit controls radiation patterns or polarizations of the antenna elements according to the multi-user antenna index, the first single-user antenna index or the second single-user antenna index.

15. The wireless communication device as claimed in claim 14, wherein the first characteristic parameter table includes a plurality of antenna elements and a first set of received signal-strength indicator (RSSI) values corresponding to the plurality of antenna elements, respectively, of the first mobile device and the second characteristic parameter table includes the plurality of antenna elements and a second set of received signal-strength indicator (RSSI) values corresponding to the antenna elements, respectively, of the second mobile device, wherein the control circuit generates the multi-user antenna index of the antenna array according to the priority of the first mobile device and the second mobile device, the first set RS SI values, and the second set of RSSI values.

16. The method for controlling the antenna array as claimed in claim 1, wherein at least one of the antenna elements are directed toward different directions.

* * * * *